United States Patent [19]

Kaul et al.

[11] 4,224,473
[45] Sep. 23, 1980

[54] TDMA MULTIPLEXER-DEMULTIPLEXER WITH MULTIPLE PORTS

[75] Inventors: Pradman Kaul, Gaithersburg; Ova G. Gabbard, Germantown; Deepak Muzumdar, Gaithersburg; Anders Eklof, Poolesville, all of Md.

[73] Assignee: Digital Communications Corporation, Gaithersburg, Md.

[21] Appl. No.: 911,250

[22] Filed: May 31, 1978

[51] Int. Cl.² .............................................. H04J 3/06
[52] U.S. Cl. .................................... 370/84; 370/102
[58] Field of Search ....... 179/15 BA, 15 AQ, 15 AV, 179/15 AF, 15 BC, 15 BS, 15 AC, 15 BW, 15 BV

[56] References Cited

U.S. PATENT DOCUMENTS

| | | | |
|---|---|---|---|
| 3,825,899 | 7/1974 | Haeberle et al. | 179/15 BA |
| 3,838,221 | 9/1974 | Schmidt et al. | 179/15 BS |
| 3,873,773 | 3/1975 | Guy | 179/15 BA |

OTHER PUBLICATIONS

A. Blank et al., "Concentrating Low Speed Lines into a High Speed Link", IBM Tech. Discl. Bull., Mar. 1976, pp. 3313-3314.

Primary Examiner—Malcolm A. Morrison
Assistant Examiner—E. S. Kemeny
Attorney, Agent, or Firm—Pollock, Vande Sande & Priddy

[57] ABSTRACT

A TDMA multiplexer-demultiplexer includes a plurality of input/output ports and common control equipment. Each input port is capable of accepting information asynchronous to the TDMA clock and at typical terrestrial clock rates. The input/output ports perform all the necessary signal processing for a TDMA terminal including pulse stuffing, changing continuous asynchronous low rate information to high bit rate burst form as well as forward acting error correcting encoding, if desirable. By incorporating all the signal processing in the multiplexer-demultiplexer, much equipment duplication is eliminated along with eliminating a requirement for multiple high frequency control and timing signal line drivers and buffers. More particularly, the transmit side of each port includes a separate elastic buffer to raise the input rate to a synchronous common higher rate. In addition, on the receive side, clocking on the low speed side of the expansion buffer is derived from the station's transmit clock.

12 Claims, 28 Drawing Figures

TRANSMIT PORT
TRANSMIT SIDE

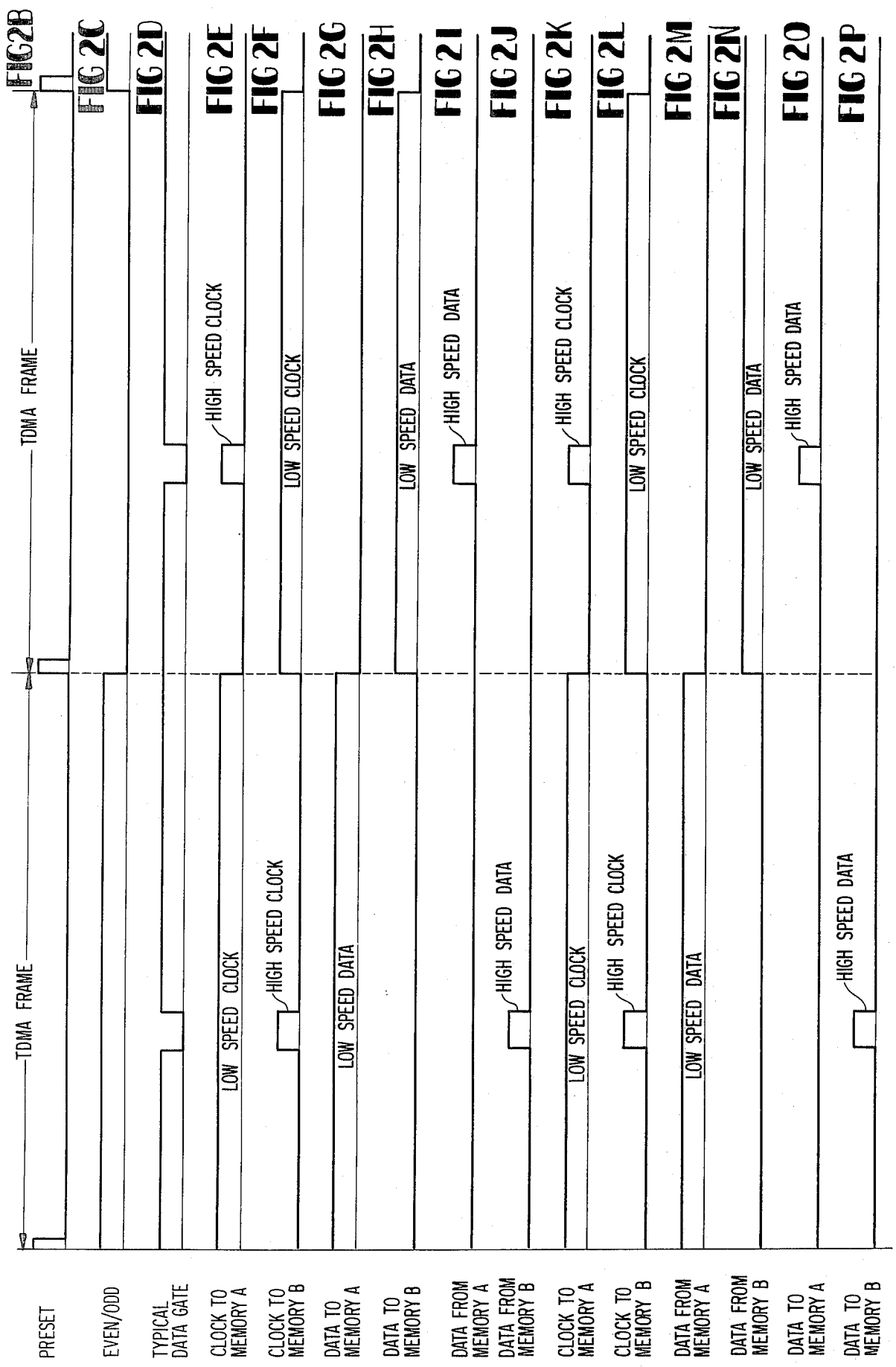

TYPICAL PORT RECEIVE SIDE

FIG 4 TRANSMIT STEERING & CONTROL

RECEIVE STEERING AND CONTROL

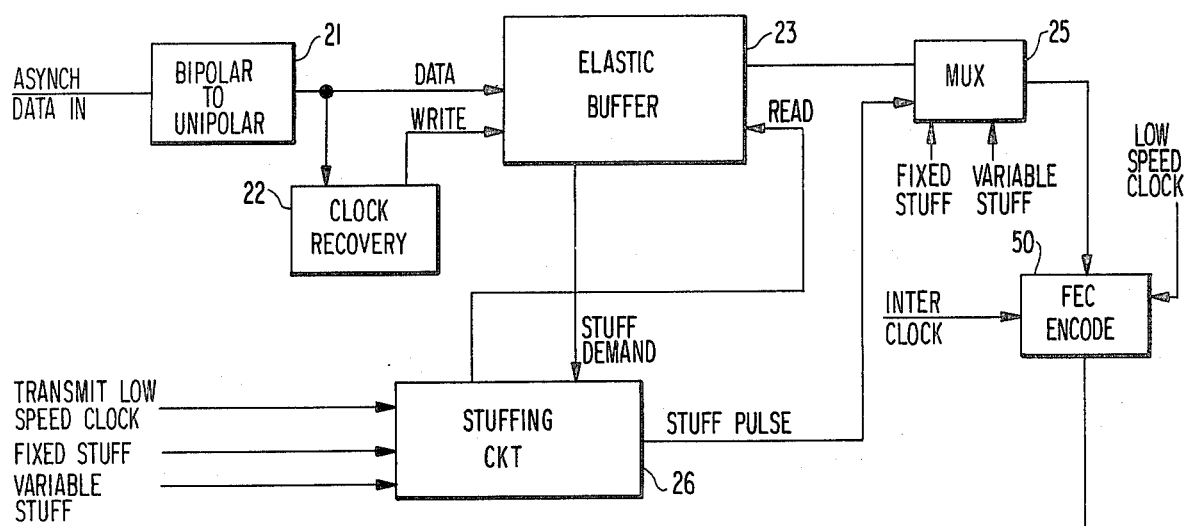
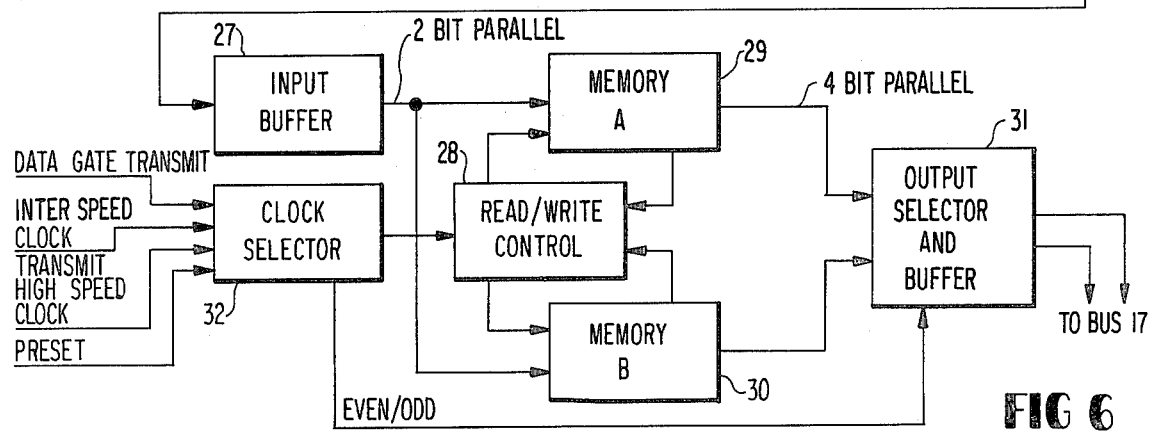
FIG 6
TYPICAL PORT
TRANSMIT SIDE
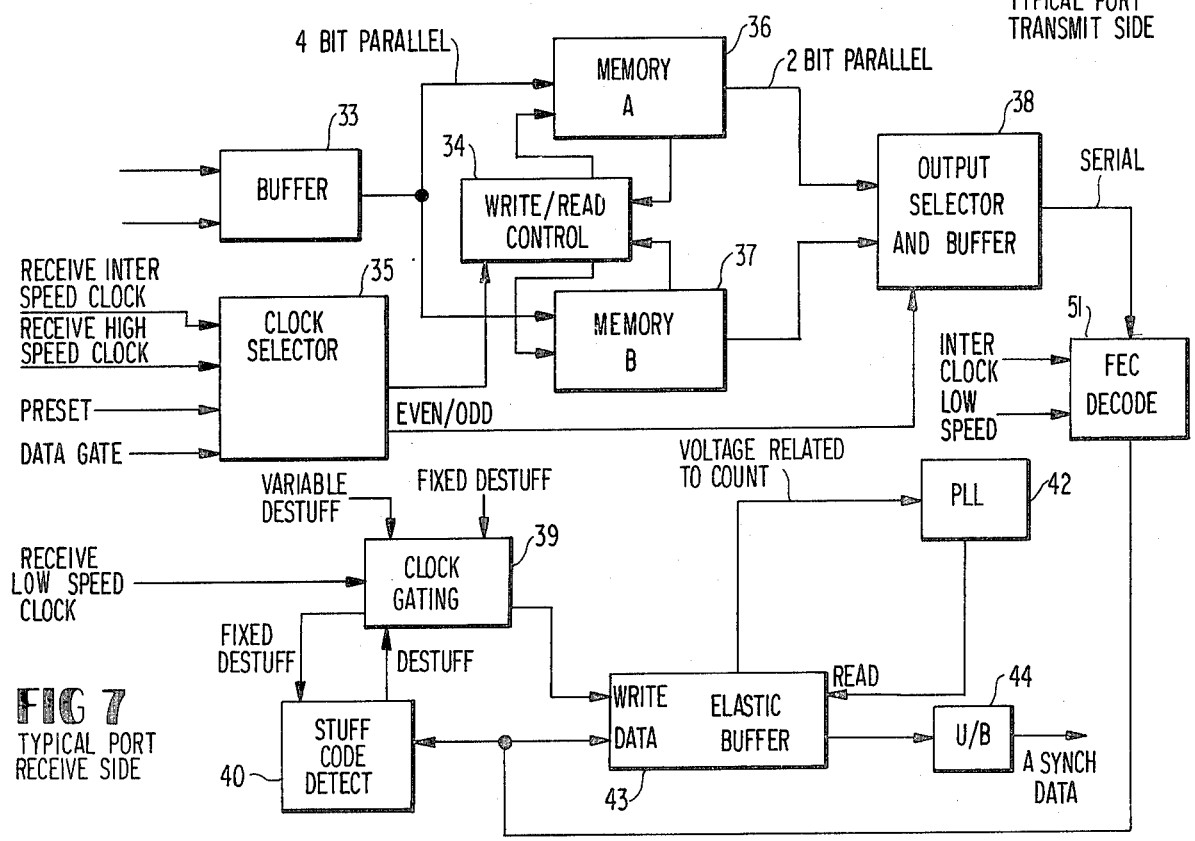
FIG 7
TYPICAL PORT
RECEIVE SIDE

TDMA MULTIPLEXER-DEMULTIPLEXER WITH MULTIPLE PORTS

FIELD OF THE INVENTION

The present invention relates to terminal equipment for an earth station in a satellite communication system employing TDMA.

BACKGROUND OF THE INVENTION

Although frequency division multiple access was originally the favored approach in the earlier satellite communication systems, time division multiple access (hereinafter TDMA) has, in recent years, become the favored approach. The essential characteristics of a TDMA system include a plurality of geographically separated earth stations, and a repeater, usually in a quasi-stationary earth orbit. In order to effectively time divide the communication channel made available by the repeater, proper timing at the various stations is essential. To this end, a common timing mark is transmitted from the repeater, usually a replica of a signal transmitted by a selected one of the earth stations, and reception of this time marker at the various ones of the earth stations establishes a reference point in time. Because of the usual unequal distance between the repeater and the various stations, the time marker so established is relative. To obtain an absolute time standard, each of the stations corrects this time reference by actually measuring the round trip propagation delay through the repeater.

The time delay between successive receipt of the time markers represents a fixed number of bit intervals corresponding to the TDMA frame. Each of the stations employs this time delay to synchronize their own internal clock to the system clock, which is usually the clock employed at the master station.

Information received at each of the earth stations, for purposes of transmission to another one of the earth stations, can be received in a variety of forms. If the received information is analog in nature, it can quite readily be digitized synchronously with the system clock. However, where the received information is digital in form, it typically will be received asynchronously with respect to the system clock or any submultiple thereof, and therefore, some type of elastic buffering is required. Furthermore, since earth stations are a relatively expensive asset, they should be capable of processing digital information which may be received at various bit rates with only minor modifications. Finally, since the terminal will be transmitting in burst form at a relatively much higher bit rate than the received information, apparatus must be provided to, in effect, accumulate information corresponding to a complete burst, and then transmit the accumulated information at the high burst rate.

Conventionally the equipment at an earth terminal is divided into equipment which is commonly employed for the entire earth terminal and equipment which is unique to each of the various information ports. A typical example of this can be found in U.S. Pat. No. 3,838,221, wherein the common equipment includes transmit and control equipment, a multiplexer and demultiplexer, and a plurality of terrestrial interface modules (or TIMs) which are unique to each of the different information ports. Each of the TIMs performs the processes of digitizing (if necessary) elastic buffering and pulse stuffing and converting the continuous information to a high speed burst rate for transmission purposes. As a consequence, the multiplexer is capable of accepting only synchronous information at the selected burst rate from the TIMs and correspondingly, the demultiplexer makes available information to each of the TIMs at the high speed burst rate. Since cooperative action between the TIMs and the multiplexer and demultiplexer is essential, this approach requires a multiplicity of control and timing signals to be transmitted between the multiplexer, demultiplexer and TIMs, and many of these timing and control signals are at bit rates which may be as high as the burst rate. This, in effect, requires a plurality of high speed, and therefore expensive, line drivers and buffers.

A further consequence of the conventional arrangement of hardware at a TDMA earth station is a large amount of equipment duplication. More particularly, the equipment employed to change the information bit rate employs a pair of memories. In a first TDMA frame, information is written continuously into one of the memories at a bit rate the same, or nearly the same, as the rate at which the information is received. Simultaneous with writing into one of these memories, the other memory is prepared for or actually engaged in reading out the information previously written therein at a much higher rate. On the next frame the function of the memories is interchanged so that, while the first memory is read, the second is writing. These functions require an address counter for properly storing and retrieving the received information and pulse sources to operate these addressing counters. Thus, each of the TIMs employed equipment to perform this function. Since the read operation has to be synchronous with the system clock, each TIM also included a phase locked loop to assure this synchronism.

Similarly, the asynchronous TIMs employs an elastic buffer and each employs a clock source to provide a read clock for the elastic buffer. This read clock, one for each asynchronous TIM, is another example of duplicate equipment.

SUMMARY OF THE INVENTION

In accordance with the teachings of the invention, these and other disadvantages of prior art earth station equipment are eliminated by essentially eliminating the TIMs as stand-alone devices and instead incorporating their functions within the multiplexer-demultiplexer. Incorporation of this equipment simultaneously allows elimination of the many high speed line buffers and drivers previously required to connect various control signals from the multiplexer-demultiplexer to the plurality of TIMs, and also eliminates much of the equipment duplication by employing common equipment in the multiplexer-demultiplexer to perform the functions at the various ones of the ports in the multiplexer-demultiplexer.

More particularly, the multiplexer-demultiplexer of the invention is capable of converting plural asynchronous terrestrial signal inputs into a burst signal or signals for transmission and for converting a recieved burst signal into plural asynchronous terrestrial signals for coupling to a terrestrial network. The multiplexer-demultiplexer includes a plurality of input ports, each of the input ports including an elastic buffer for writing therein in response to data received at the port at a rate commensurate with the rate of receipt of data at the port, reading from the elastic buffer is performed substantially synchronously at a first rate at all the ports, a compression buffer is written with data read from the elastic buffer, reading from the compression buffer taking place at a high bit rate characteristic of TDMA transmission, a common transmit control including a clock for generating clocking signals at the first rate and at the high bit rate and a bus system for distributing all the clocking signals to all the ports, and a gating device for selectively gating reading from the compression buffer at selected times.

BRIEF DESCRIPTION OF THE DRAWINGS

The invention will now be explained by describing a preferred embodiment to enable those skilled in the art to practice the invention in conjunction with the attached drawings in which like reference numerals designate identical apparatus, and in which:

FIGS. 2B–2P illustrate typical signals in the transmit and receive side of the ports;

FIG. 6 is a block diagram of a typical port, transmit side modified for the use of forward acting error correcting encoding; and, FIG. 7 is a block diagram of a typical port, receive side modified for the use of forward acting error correcting decodong.

DETAILED DESCRIPTION OF PREFERRED EMBODIMENTS

Figure 1A:
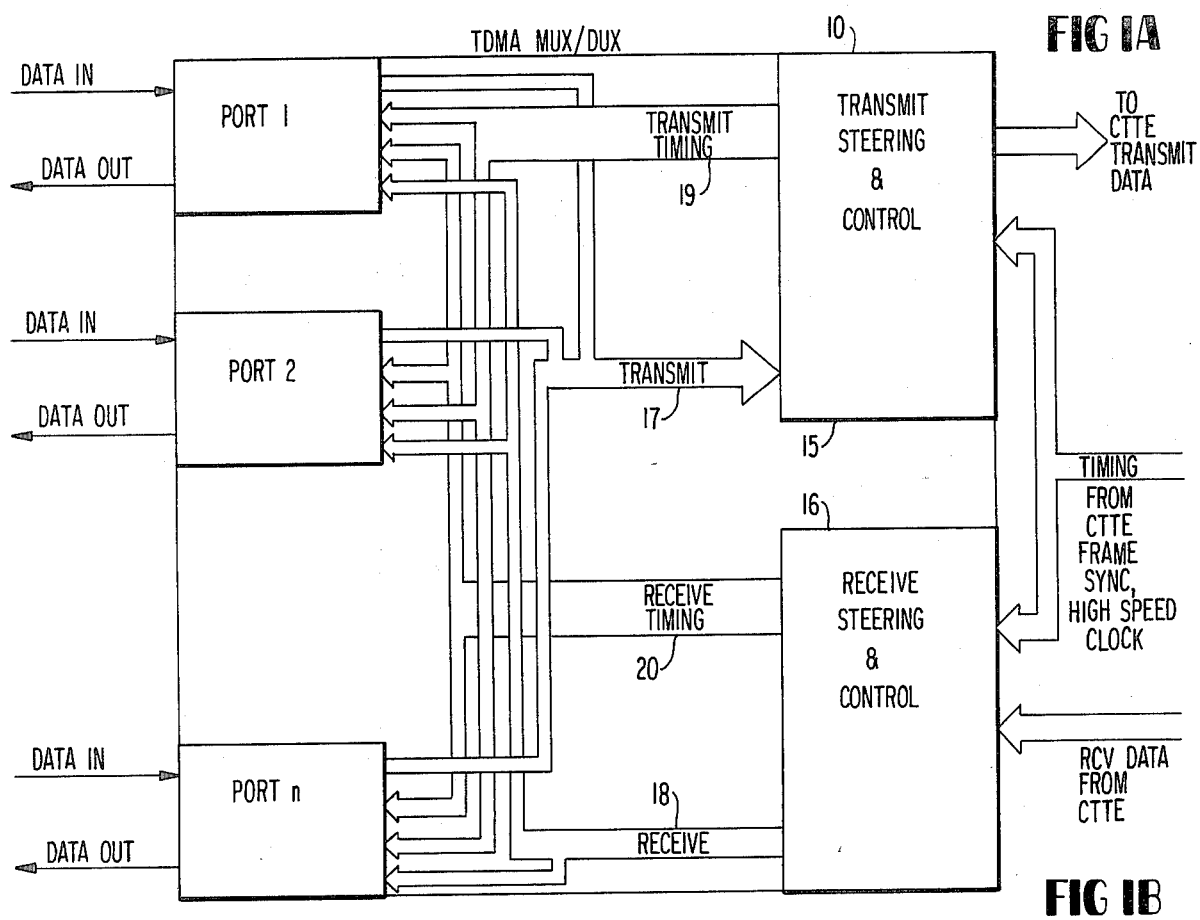
FIG. 1A is a block diagram of the MUX/DUX.

FIG. 1A illustrates a block diagram of a preferred embodiment of the multiplexer-demultiplexer. As shown in FIG. 1, the multiplexer-demultiplexer 10 includes a plurality of ports labelled port 1 through port n. As shown, each port has a data input terminal and a data output terminal, data in the sense used herein refers to information which is to be transmitted, as opposed to signalling and control information which is used for either system housekeeping functions or station housekeeping functions. The multiplexer-demultiplexer is intended for use in earth stations in a TDMA communication system employing satellite repeater in quasi-stationary earth orbit. Inasmuch as descriptions of TDMA systems are available in the literature, no further description will be provided herein.

A typical ground station in such TDMA system includes an interface to a terrestrial information network such as the telephone network. At this interface, signals from the terrestrial network are received, and the station processes then so as to provide for efficient communication of the information from the earth station through the satellite repeater to a second earth station. Typically, the second earth station may also interface to another terrestrial information network to which it will pass the information received from the satellite after further processing to provide the information in a form capable of being communicated to the receiving terrestrial information network. The output of the multiplexer-demultiplexer 10 is coupled to the station common transmit terminal equipment (hereinafter CTTE). The multiplexer-demultiplexer receives, from the CTTE, both received information signals, as received from the satellite repeater, along with timing signals. The timing signals enable the multiplexer to properly process signals from the terrestrial information network for coupling to the CTTE, and enable the demultiplexer to process burst signals received from the CTTE into signals capable of being coupled to the terrestrial information network. Although FIG. 1A illustrates each of the ports of the MUX/DUX 10 as having a data input terminal and a data output terminal, those skilled in the art will appreciate that bidirectional ports are not essential to the invention, and as will be pointed out below, any desired port, or all the ports can be unidirectional, i.e., having only a data input terminal or only a data output terminal.

The number of ports in the MUX/DUX 10 of FIG. 1A is not specified, and in accordance with the principles to be discussed hereinafter, the number of ports can be selected within quite arbitrary limits, although, in an embodiment which has been constructed, 28 ports were provided.

As mentioned above, prior art TDMA ground stations include mutliplexer-demultiplexers which were coupled to the terrestrial information network through modules referred to in some instances as terrestrial interface modules (or TIMs). Since the interface between the MUX and the TIMs was, in the prior art, synchronous, and since the interface between the terrestrial information network and the TIMs was asynchronous (at least for those TIMs receiving digital information), the TIMs had the task, among others, of adjusting the bit rates of various signals so that signals input to the MUX were fully synchronous. As noted above, it is an object of the invention to eliminate this necessity and therefore, the MUX/DUX 10 of FIG. 1A is capable of accepting asynchronous digital signals, thus eliminating a major function previously required in prior art TIMs.

In addition to the ports, the MUX/DUX 10 of FIG. 1 includes a transmit steering and control 15 and a receive steering and control 16. A transmit data bus 17 couples high speed outputs of the various ports to the transmit steering and control 15, and a receive bus 18 couples high speed data signals from the receive steering and control 16 to input terminals of the various ones of the ports. In addition to this interchange of signals, the transmit steering and control makes available various transmit timing signals over conductors represented at 19 to the various ports, and likewise, the receive steering and control makes available receive timing signals over conductors represented at 20, to the various ports.

Before further describing the components illustrated in FIG. 1A, and the operation of the inventive MUX, reference is made to FIGS. 1B through 1E to illustrate typical TDMA operations.

Figure 1B:
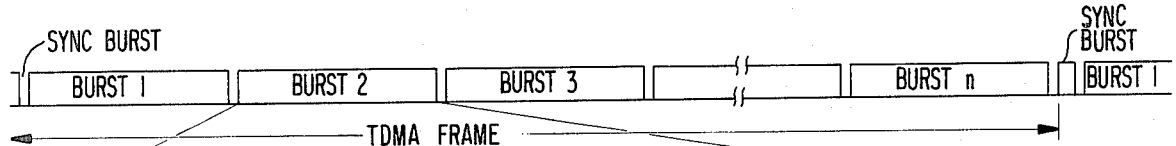
FIGS. 1B–1G are timing diagrams illustrating typical signals in the TDMA system.

FIG. 1B illustrates a typical TDMA frame as a function of time referenced at the satellite repeater. More particularly, as shown in FIG. 1B, each frame includes a synchronization burst and a plurality of station bursts. Typically, each burst may be transmitted from a different station, although a single frame may include more than one burst from a single station. The period of the TDMA frame, although bounded by practical considerations, both at high and low end, may generally be selected quite arbitrarily within these limits. Likewise, the length of each burst may also be selected in accordance with well known parameters.

Figure 1C:
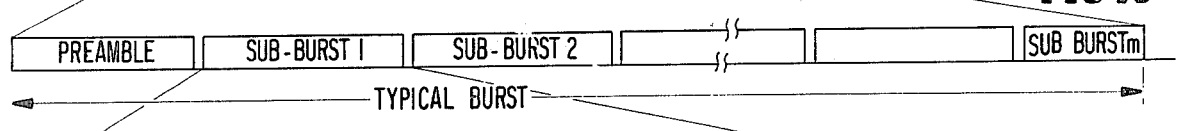

FIG. 1C illustrates in more detail the makeup of a typical burst. As shown in FIG. 1C, each burst includes a preamble, the makeup and functions of which are known to those skilled in the art, and a plurality of sub-bursts. Typically, each sub-burst is allocated to a particular port, and thus, the timing of the sub-burst defines the time during which the port should make available data signals to the transmit steering and control. Since a port is allowed to transmit only during the time of its sub-burst, and one sub-burst is allowed per TDMA frame, the ratio of the sub-burst duration to the TDMA frame duration defines the factor by which the data rate of information received from the terrestriial network must be increased in order to properly serve the terrestrial network in the time division multiplex format.

Figure 1D:
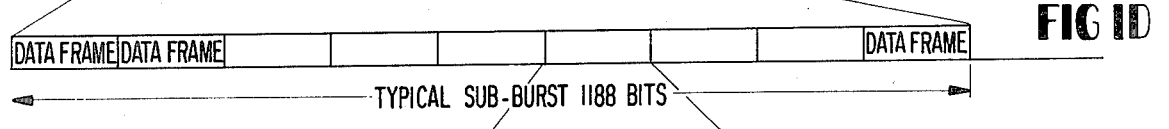

FIG. 1D illustrates that the typical sub-burst comprises a plurality of data frames, and in the example shown in FIG. 1D, 9 data frames are included in a sub-burst which sub-burst comprises 1188 bits.

Figure 1E:
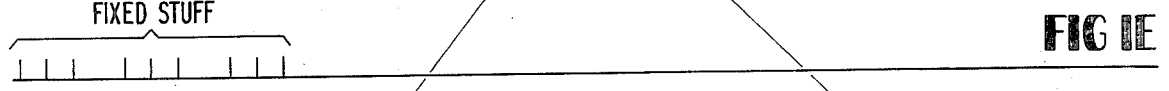
Figure 1F:
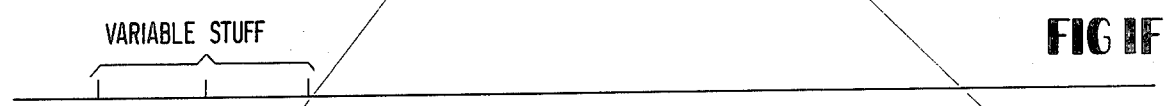

In order to take into account the asynchronous nature of the inputs, pulse stuffing is employed. That is, more particularly, the nominal data rate (for example a T1 rate of 1.544 MHz.) is increased to a common higher synchronous rate (for example, 1.584 MHz.) by adding dummy or "stuffed" pulses. In order to enable the receiver to remove the "stuffed" pulses, a code is also included which indicates whether or not real data bits or "stuffed" pulses are received. In the prior art apparatus, each of the TIMs employed stand-alone pulse stuffing apparatus. Since each of the digital data inputs may be asynchronous, the stand-alone pulse stuffing apparatus was employed to uniquely stuff as necessary. The inventive multiplexer-demultiplexer, instead, employs a common stuffing command generator which generates both fixed stuffed pulses and variable stuffed pulses. On each occurrence of a fixed stuffed pulse, one or another of a unique control signal, i.e., either one or zero, is added to the data stream to indicate whether or not stuffing is or is not occurring. The combination of these control signals for any frame comprises the stuff code to indicate the presence or absence of stuffing. In the variable stuff pulse space, a pulse is stuffed if required, otherwise a real data bit is transmitted. Accordingly, the common stuff command generator is time shared and each port need only have a stuff code generator to generate the unique signal, either one or zero, depending on whether or not stuffing is to take place in dependence upon the condition of an elastic buffer, and to generate the stuffed pulse if necessary. The timing functions are handled by the common stuff command generator. The use of a distributed stuffing code provides protection against burst errors, and the use of a three-bit code enables majority voting logic techniques to by employed, giving further error protection. Accordingly, FIG. 1E illustrates the fixed stuff pulses regularly occurring in each data frame, i.e., in the example given in the application, three fixed stuffed pulses S occur per data frame. FIG. 1F shows the variable stuff pulse V, and as illustrated, this occurs once per data frame.

Figure 1G:
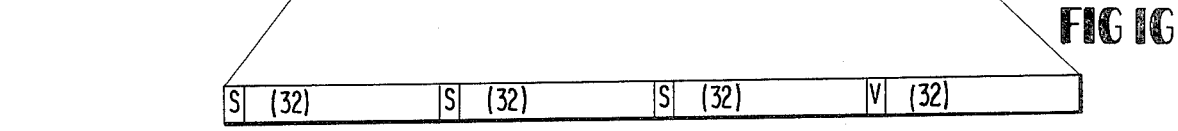

Finally, FIG. 1G illustrates the specific format of a typical data frame. More particularly, the data frame comprises four sub-frames, each sub-frame comprising 33 bits in this example. The first three sub-frames include 32 real data bits and a stuffed pulse S, i.e., one or zero, depending on whether or not stuffing is to take place. The fourth sub-frame also includes 32 real data bits, and the variable pulse stuff location V which may include a real data bit, if available, or a stuffed pulse if a real data bit is not available. Whether or not this v-slot variable stuffed pulse is a real data bit or not is detected at the receiver by the signals received in the three fixed stuff slots.

Employing a sub-frame as shown in FIG. 1G also enables a further advantage of the invention to be employed. More particularly, since four sub-frames make up a frame, the input rate handled by the port can be varied by reducing the low speed clock rate. For example, if rather than a nominal 1.544 MHz. input pulse rate, half that rate was desired, the low speed clock is reduced by half (by adding a divided by two circuit in the clock generator); under those circumstances, the data frame comprises two sub-frames rather than four. In a similar fashion, the data rate can be divided by four (by further reducing the low speed clock rate by an additional factor of two) in which case, the data frame would then comprise only a single sub-frame.

Figure 2A:
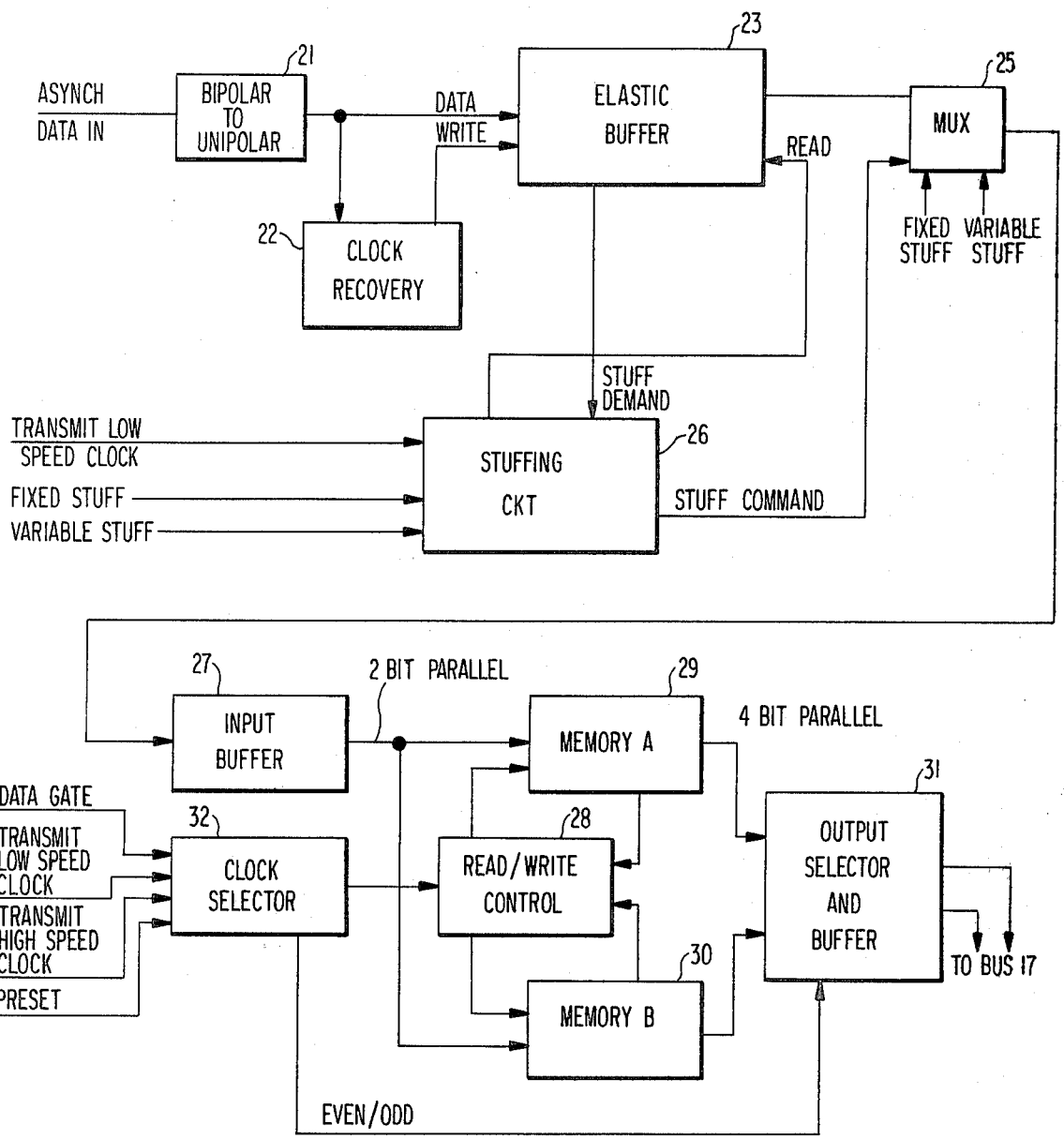
FIG. 2A is a block diagram of a typical port, transmit side.

FIG. 2A is a block diagram of the transmit side of a typical port. As shown in FIG. 2A, the port includes a bi-polar to uni-polar converter 21 for converting bi-polar received digital signals to uni-polar form. The output of the converter 21 is coupled to a clock recovery circuit 22 and to a write input of an elastic buffer 23. The output of the clock recovery circuit 22, comprising clock pulses spaced at the data rate of data actually received, is provided to a clocking input terminal of the elastic buffer 23. The output of the stuffing circuit 26 controls the position in the elastic buffer from which data is read, data being written into the input location, and previously stored data being shifted up. The data output of the elastic buffer is provided to a multiplexer 25. Another input to the multiplexer 25 is an output of stuffing circuit 26 which is the stuff command as well as the fixed and variable stuff pulses. Inputs to the stuffing circuit 26 include the low speed clock, the fixed stuff pulses and the variable stuff pulses. The read clock for the elastic buffer 23 is provided by the stuffing circuit 26 and it is the same as the low speed clock with several pulses omitted so that the read rate corresponds to the received data rate. The elastic buffer 23 and elastic buffer 43, on the receive side may be FiFO's such as Fairchild 3341.

In fashioning the read clock for the elastic buffer 23, the stuffing circuit 26 eliminates low speed clock pulses corresponding to each fixed stuff pulse. The low speed clock rate and the nominal data rate are selected such that elimination of three clock pulses per 132 bits (in the data frame) is still slightly faster than the input data rate. Accordingly, as the process of writing and reading from the elastic buffer proceeds, the address counter 24 will see a smaller and smaller count since the elastic buffer is being read from faster than it is being written into. When the count in the address counter reaches a selected value, a stuff demand is provided to the stuffing circuit 26. On the next occurrence of a variable stuff pulse, a further pulse is omitted from the low speed clock to form the read clock. In this fashion, a tracking loop is created eliminating just enough pulses from the low speed clock to keep the buffer from underflowing. At the same time, the stuff circuit 26 eliminates the read clock, a stuff pulse is provided to the multiplexer 25 to fill the slot.

The stuffing circuit 26 also fills the slots in the data train outputted by the multiplexer 25 for each of the fixed stuff pulse slots whose corresponding read clock pulses are eliminated. The signal inserted into these slots by the stuffing circuit 26 depends upon whether or not a stuff demand is present. For example, if a stuff demand is present at the beginning of a data frame, a read clock pulse is eliminated from the low speed clock for each of the fixed stuff pulse positions and the stuffing circuit 26 provides a pulse input to the multiplexer 25 which indicates presence of the stuff demand (for example, a one for the presence of a stuff demand and a zero for the absence of a stuff demand). In the variable stuff slot of the data frame, a further read clock pulse is eliminated, and if a stuff demand is present, the stuffing circuit 26 provides a stuff pulse for the multiplexer 25. In this fashion, the output of the multiplexer 25, coupled to input buffer 27, comprises an interleaved pulse train, a majority of the pulses are provided by the elastic buffer 23, but some of the pulses are provided by the stuffing circuit 26, and the pulse train is synchronous with the low speed clock. The output of the input buffer 27 is provided as data inputs to a pair of RAMs 29 and 30, hereinafter referred to as memory A and memory B. A clock selector 32 receives signals from the transmit steering and control 10 and distributes these signals as required. More particularly, the clock selector 32 receives the data gate, low speed clock, high speed clock and preset signals, and provides an output to the read/write control 28. Based on the preset signal, the clock selector 32 also produces an even/odd signal to distinguish between adjacent frames for reasons which will be explained hereinafter. The even/odd signal is also coupled to the output selector and buffer 31. The output selector 31 also receives outputs from the memory A and memory B.

The apparatus including input buffer 27 through the output selector and buffer 31 as well as the clock selector 32 translates the data which is now synchronous, but at a low speed, to burst form at the highspeed clock rate employed for burst transmission. The operation of this apparatus will be explained in connection with FIGS. 2B through 2P which illustrate typical waveforms.

As illustrated in FIGS. 2B and 2C, the preset signal is employed to generate an even/odd signal which lasts for the period between the preset signals and sequentially alternates in amplitude. As will be explained hereinafter, preset signals correspond to the beginnings of each of the TDMA frames, and accordingly, each even/odd signal lasts for the period of the frame. The even/odd signal is employed to determine whether memory A or memory B reads or writes in any particular frame; these memories alternate in function in sequential frames.

FIGS. 2E and 2F illustrate that memory A receives low speed clock on one frame, and on the next succeeding frame, memory B receives the low speed clock. Each memory writes data from the input buffer during the period it is receiving the low speed clock. Thus, as shown in FIGS. 2G and 2H, memory A will write data in one frame, and memory B will write data in the next succeeding frame.

The readout of the memories is operated in response to the high speed clock. The high speed clock is produced and gated with the data gate in the clock selector 32. Production of the data gate signal will be discussed hereinafter, but FIG. 2D illustrates typical data gates in succeeding frames, and accordingly, FIGS. 2E and 2F illustrate the high speed clock being received at memory A and memory B, respectively.

Accordingly, on alternate cycles, the memory A receives low speed clock and writes data received from the input buffer 27, which is now synchronous with the low speed clock. On the next succeeding frame, the data written in memory A will be read out under control of the high speed clock gated with the data gate. As will be discussed hereinafter, the data gate is produced synchronous with the sub-burst (see FIG. 1C) and provided to the port which is allowed to transmit in that interval. Actually, the data gate defines the sub-burst position and duration.

Referring now to FIG. 1A, it will be appreciated how asynchronous data received at a variety of ports is converted to synchronous data at the low speed clock rate, and this synchronous data is then read out at the high speed clock rate. Providing sequential data gates, during the period of the station's burst, to various ones of the ports, produces a serial data stream at the high speed clock rate on the transmit bus 17, which is coupled through the transmit steering and control 10 to the CTTE for transmission purposes.

Figure 3:
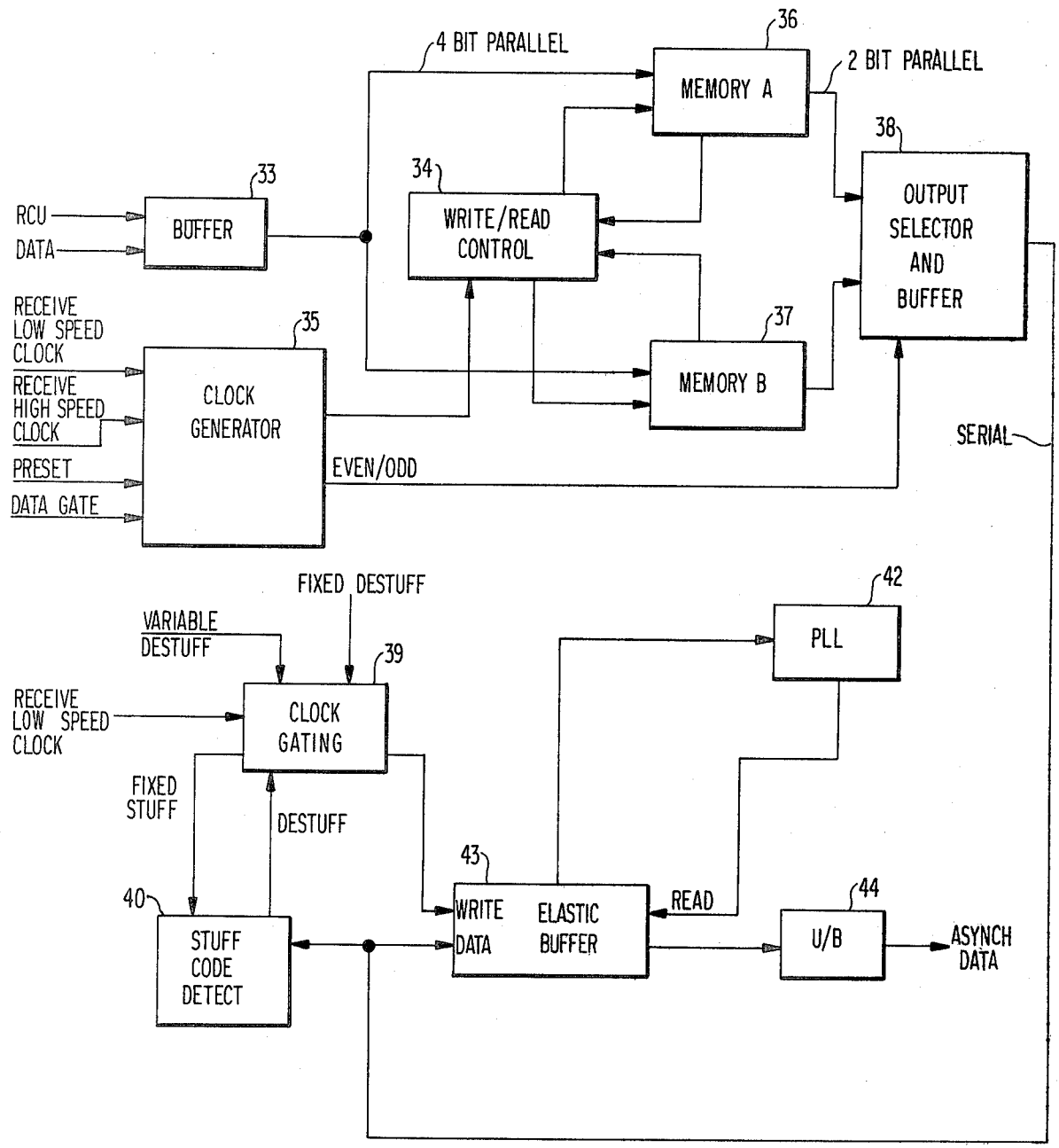
FIG. 3 is a block diagram of a typical port, receive side.

FIG. 3 is a block diagram of a typical port, receive side. The receive side of a port performs similar but complementary functions to the transmit side. Accordingly, the receive bus 18 is coupled to the receive buffer 33, outputs of which are coupled to random access memories 36 and 37 (which will be hereinafter referred to as memory A and memory B). A clock selector 35 receives the receive side low speed clock, the receive side high speed clock, and a preset and data gate signals from the receive steering and control. The clock selector 35 controls the write/read control 34 as well as producing an even/odd signal to control the output selector and buffer 38. Reference again to FIGS. 2B, 2C and 2D illustrate typical forms for the preset, even/odd and data gate signals and FIGS. 2K through 2P illustrate operation of the memories A and B.

More particularly, as shown in FIGS. 2K and 2L, a high speed clock is provided first to one memory and then to a second memory in the subsequent frame. Correspondingly, data is written into these memories commensurate with their receipt of the high speed clock as shown in FIGS. 2O and 2P.

In response to the low speed clock, data is read from the memories at a rate commensurate with the low speed clock as shown in FIGS. 2M and 2N, low speed clocks being supplied to the corresponding memories as shown in FIGS. 2K and 2L.

As mentioned above, the data gate is produced at different times for different ports on the receive side. A data gate is generated and provided to a port synchronous with a sub-burst which is destined for a user coupled through that port. Accordingly, the memories in any port respond to the portion of the burst corresponding in position and duration with the data gate coupled to the clock selector of that port. Data written into either one of the memories in one frame is read out of the memory at the low speed rate on the next succeeding frame. Thus, the output of the output selector and buffer 38 comprises a serial data stream at the low speed clock rate and synchronous therewith. This output is coupled to an elastic buffer 43 and a stuff code detector 40. A clock gating circuit 39 has several input signals, comprising fixed de-stuff pulses, variable de-stuff pulses, the receive low speed clock and a de-stuff command from the stuff code detector.

The production of the fixed de-stuff and variable de-stuff pulses will be discussed hereinafter in connection with the receive steering and control. Suffice it to say at the present time, that similar to the transmit side, each sub-burst comprises a plurality of data frames, and each data frame comprises, in the example described herein, four sub-frames. Each sub-frame includes 32 real data bits and a stuffing pulse position. The stuffing pulse position for three of the four data frames is filled with the stuffing pulse code, one bit per position, whereas the fourth stuffing pulse position is the variable stuffing pulse position which may or may not carry a real data bit depending upon the necessity therefor. Accordingly, the stuff code detector operates synchronously with the fixed de-stuff pulses coupled thereto by the clock gating circuit 39. The use of a three bit stuffing pulse code enables majority voting logic techniques to be employed, and if two of the three bit positions indicate a stuffed pulse, then the stuffing code detector 40 returns a de-stuff command to the clock gating circuit 39. This de-stuff command operates in conjunction with the variable de-stuffing pulse in a manner which will be explained below.

The serial data stream is also provided to the elastic buffer 43 at a data input terminal. The clock gating circuit 39 provides a write input to the elastic buffer and simultaneously provides an up counting command to an address counter 41.

When a de-stuff command is detected, the clock gating circuit merely deletes the low speed clock pulse which occurs at the time of the variable de-stuff pulse. On the other hand, if a de-stuff command is not produced, then the low speed clock pulse corresponding to the variable de-stuff pulse is coupled through to the address counter and elastic buffer. The low speed clock pulses corresponding to each of the fixed de-stuff pulses are always deleted.

As a result, for each data sub-frame including a fixed de-stuff pulse, the elastic buffer only receives the 32 real data bits because it does not receive a write command at the time of the fixed de-stuff pulse. If the stuffing code detector determines a stuff pulse is present, the elastic buffer also does not receive a write command at the time of the variable de-stuff pulse as the corresponding low speed clock pulse will be deleted, and accordingly, the stuffed pulse will not be written into the elastic buffer. Conversely, if at the time of the variable de-stuff pulse, the de-stuff command is not present, then the corresponding low speed pulse will be coupled through to the elastic buffer allowing the real data pulse occurring in that slot to be written therein.

In the example being described herein, in which low speed clock rate is 1.584 megabits and a nominal asynchronous data output rate is 1.544 megabits, the elastic buffer 43 has an effective length of about 100 bits, and is part of a tracking loop which maintains the voltage controlled oscillator in the phase locked loop 42 running at the average frequency of the write clock. The relatively large size of the buffer allows the VCO in the phase locked loop to remain at a relatively stable frequency while the data rate may be subjected to relatively large short term fluctuations.

The frequency controlling voltage for the voltage controlled oscillator is generated by a position sensing circuit at the output of the elastic buffer 43. This error voltage and the VCO is arranged to maintain the elastic buffer at its center position on average.

Figure 4:
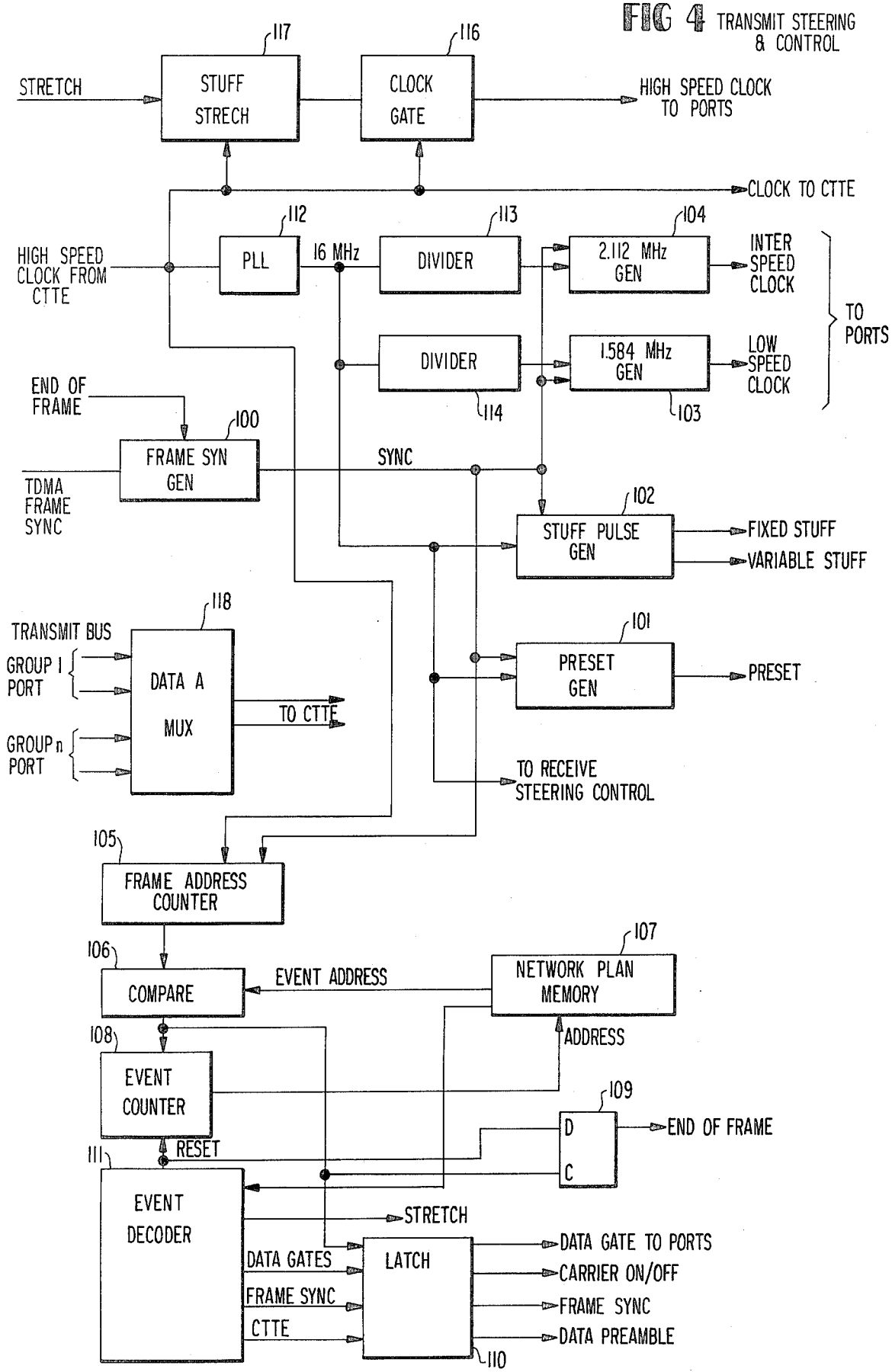
FIG. 4 is a block diagram of the common transmit steering and control.

The transmit steering and control, which generates many of the clock and timing signals, employed at the typical port, transmit side, is illustrated in FIG. 4. The two significant signals input to the transmit steering and control to control the timing are the frame synchronization signal, from the burst synchronizer (not illustrated but well known to those skilled in the art) and the high speed clock signal at the TDMA burst rate. These signals may be generated in any well known fashion, and therefore, the production of these signals is not illustrated. The TDMA frame synchronization signal is input to a frame synchronization generator 100. This signal is gated with the end of frame signal (the production of which is discussed hereinafter) and produces a synchronizing signal which is coupled to a variety of clock generators including the preset signal generator 101, a stuff pulse generator 102, and a pair of low speed clock generators 103 and 104. Finally, the sync signal is also provided to reset a frame address counter 105. The frame address counter 105 is clocked by the high speed clock and is arranged to count up to a value which is at least the number of symbols in a frame. Inasmuch as the frame address counter 105 is synchronized with the TDMA frame synchronization signal, it provides a ready means for identifying any particular symbol location in the frame. The multi-bit output of the frame address counter 105 is coupled to a multi-bit comparator 106. The other input to the multi-bit comparator 106 is provided by a portion of the output of the network plan memory 107, and comprises the event address portion of the output of that memory.

The network plan memory 107 can be a fixed, i.e., READ ONLY MEMORY, or it can be software controllable, in accordance with known techniques in the art. The essential purpose of the network plan memory 107 is to control the location of the station's burst in the TDMA frame as well as the position and duration within the burst of each of the sub-bursts. This is accomplished by the production of the data gate to the various ports which will be described hereinafter. On the receive side, the network plan memory also controls the data gates coupled to the receive ports and therefore determines which portions of which bursts are processed by which ports. An output of the comparator 106, on a comparison between the event address presented by the network plan memory 107 and the condition of the frame address counter 105, is coupled to an event counter 108, to the clocking input of an end of frame flip-flop 109 and the control input for a latch 110. The event counter, in response to an output from comparator 106, increments its count. The output of the event counter 108 is provided as the addressing input to the network plan memory 107.

The event address is only one portion of the contents of the memory 107, and the remaining portion, consisting of the event code, is coupled to an event decoder 111. Accordingly, each event address has associated with it, in encoded form, the identification of a particular event. The event decoder responds to this portion of the contents of the network plan memory and provides a plurality of outputs, i.e., a stretch pulse, a plurality of data gates, frame sync pulse, as well as signals for the CTTE. The last three of these outputs are provided to the latch 110 which is arranged to store the particular signal on the occurrence of an output from comparator 106. The output of the latch 110 provides data gate signals to various ports, a carrier on/off signal, a frame sync signal and a data preamble signal, the latter three signals are provided to the CTTE equipment. At the conclusion of each frame, the event decoder 111 decodes a reset signal which is coupled to reset the event counter 108 and provides an input to the end of frame flip-flop 109. The Q output of this flip-flop is the end of frame signal which is provided to the frame sync generator 100.

In operation, the apparatus just described operates as follows. Assume the event counter 108 has just been reset, and accordingly, the network plan memory has an event address on an event address output corresponding to the first event in the frame associated with the station at which the apparatus is located. The corresponding event, in coded form, is presented to the event decoder 111. The frame address counter has been reset at the frame synchronizing signal, and accordingly, begins to count symbols. When the symbol counted corresponds to the event address, comparator 106 produces an output. This increments the event counter causing the next event address in the network plan memory to be provided to the comparator 106. The comparator output also latches into the latch 110 the event decoded by the event decoder 111. Accordingly, if the event was the initiation of the station's burst the carrier on/off signal would come up. At some succeeding count, the next event would occur and the same operation would ensue except that the data preamble signal would come up, causing the CTTE equipment to transmit the data preamble. On the next comparison, a data gate may be produced to enable a particular port to produce its sub-burst. Following that event, a different gate would be produced and the first-mentioned data gate would fall. In this fashion, the network plan memory 107 controls the production of several data gates, if desired, and finally, the carrier is disabled.

The upper portion of FIG. 4 illustrates the production of the various timing signals, and that apparatus will now be described.

The upper portion of the transmit steering and control includes a stuff pulse generator 102 and a preset pulse generator 101. Both these generators are clocked by phase locked loop 112, which itself is clocked from the transmit high speed clock. In one embodiment of the invention, the phase locked loop 112 is arranged to produce a 16 MHz. clock rate. Each of the generators 101 and 102 are also synchronized to the TDMA frame by the sync pulse output of the frame sync generator 101. The stuff pulse generator 102 produces nine stuff frames per TDMA frame. Each of the nine frames includes three fixed stuff pulses, located at predetermined locations in the frame, and a single variable stuff pulse also located at a predetermined location in the frame, see for example, FIGS. 1E and 1F. The preset generator 101 produces a single preset pulse per frame which is employed at the clock selector 32 of the typical port transmit side (FIG. 2A) and the clock selector 35 of the typical port receive side (FIG. 3). This pulse is used to preset the address counters at the beginning of each TDMA frame. The output of phase locked loop 112 is also divided down by dividers 113 and 114 to clock a pair of pulse generators 103 and 104. A one of these generators, for example, generator 103, produces the low speed clock pulses, whereas the other generator, 104, produces low speed clock pulses at a somewhat higher rate for reasons which will be explained hereinafter.

Finally, clock gate 116, clocked by the high speed clock from the CTTE, produces the high speed clock to the various transmit ports. This clock is the nominal 31 MHz, but the stuff stretch circuit 117 modifies this as follows.

In the absence of forward acting error correcting encoding, the error resistance of the three bit stuff code can be increased by stretching the first and last bit of the code to three bits each. On the receive side, the stretched code bits are individually majority voted on in a two out of three decision circuit and compressed back into one bit each. This eliminates some errors that may occur in the transmission before the restored three bit code arrives at the stuff code detector in the channel port, receive side.

The code stretching function is achieved by operating on the high speed clock (nominally 31 MHz.). Eliminating two consecutive clock pulses at the time of the first and last bit of each stuff code causes these bits to be stretched from one to three bits each. This function is activated by a pulse from the event decoder 111, entitled "STRETCH". This pulse is input to the stuff stretching circuit 117; in response to this pulse the stuff stretch circuit 117 eliminates or inhibits the clock gate 116. As a result, the output of the clock gate 116, the high speed clock, is nominally 31 MHz., which has pairs of pulses omitted at the time of the stretch pulse.

Inasmuch as this function may be eliminated, when forward acting error correcting encoding is employed, it is only necessary to open the output of the stuff stretch circuit 117 under those circumstances.

The transmit bus is also coupled to the transmit steering and control, as an input to the multiplexer 118. The output of the multiplexer is coupled to the CTTE. The multiplexer need not be controlled since the bursts themselves are sequentially gated by the sequential data gates.

Figure 5:
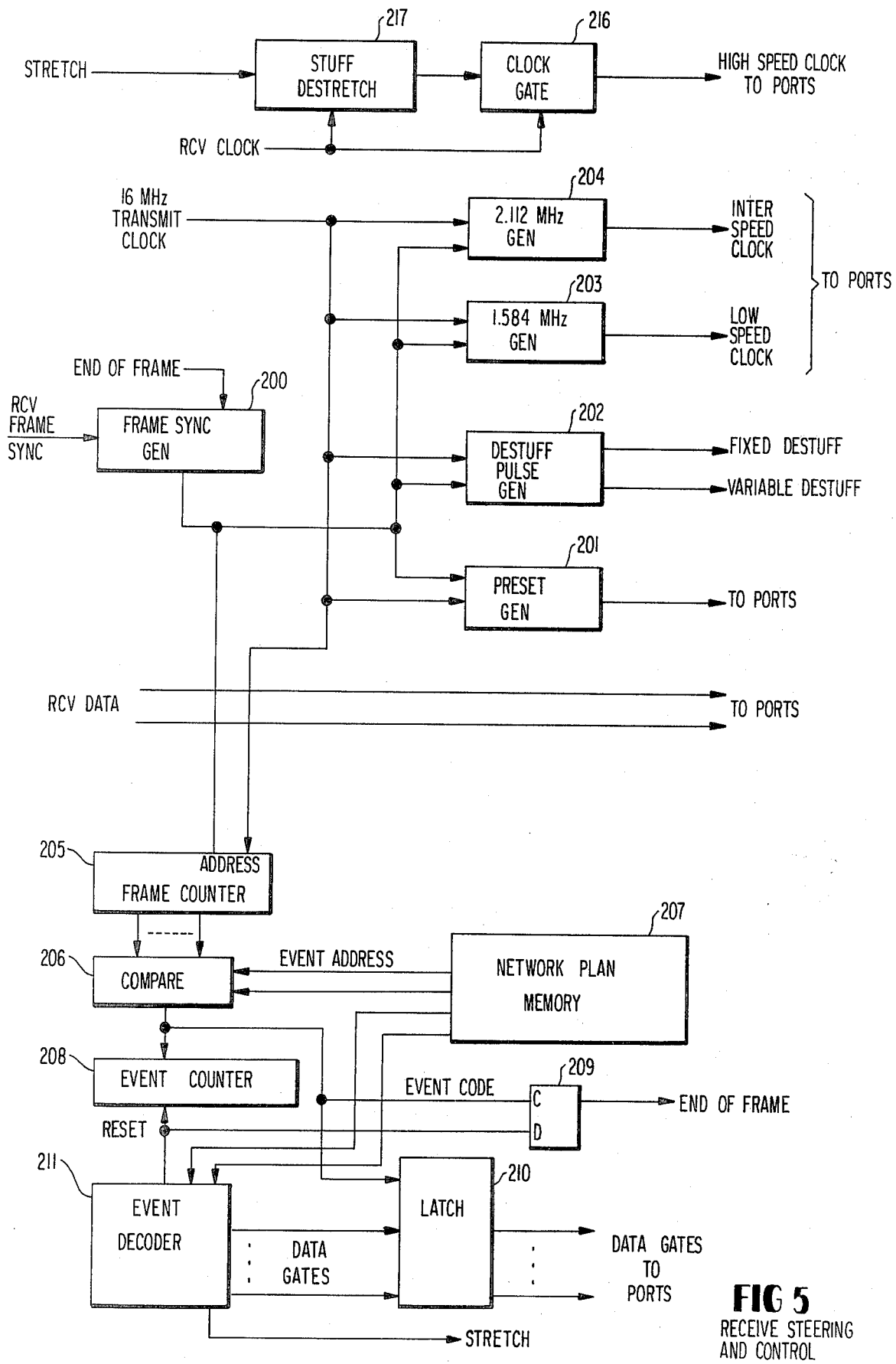
FIG. 5 is a block diagram of the common receive steering and control.

FIG. 5 illustrates a block diagram of the receive steering and control. In many respects, it is the complement to the transmit steering and control (FIG. 4).

At the lower portion of FIG. 5, the receive steering and control includes the event generating signals which, in the case of the received steering and control, are the data gates to the various ports for demultiplexing the received signals in accordance with information contained in the network plan memory 207. More particularly, a frame address counter 205 is clocked at the received clock rate, and is synchronized to the received frame synchronization signal by the synchronization output of frame synchronization generator 200. The output of the frame address counter, which thus corresponds to a symbol address is provided as one input to a comparator 206. The other input to the comparator is the event address output of the network plan memory 207. When comparison is achieved, a comparison output increments an event counter 208 and also operates the latch 210. For each event address input to the comparator 206, the network plan memory 207 supplies a code indicating the corresponding event to an event decoder 211. The output of event decoder 211 comprises a plurality of data gates which come up depending upon the information stored in the network plan memory and terminate in response to a following event also stored in the network plan memory. One event stored in the network plan memory is a reset signal indicating termination of the frame. This output of the event decoder 211 resets the event counter 208 and also is provided as an input to an end of frame flip-flop 209, which is clocked by the compare signal. The end of frame output of flip-flop 209 is the end of frame input signal to the frame synchronization generator 200, which is gated with the received frame sync to produce the synchronizing signal previously mentioned.

Accordingly, with the network plan memory including information as to which portions of the received signal are to be demultiplexed by selected ports, the proper data gates are generated at the selected time to enable the selected port to demultiplex the received signal.

The upper portion of FIG. 5 illustrates the generation of the various clocks required in the system. More particularly, the 16 MHz. transmit clock clocks low speed generators 203 and 204, these clock generators are synchronized with the synchronization output of the frame synchronization generator 200. One of these signals is the low speed clock, provided to the ports, receive side. The other clock signal is used with the optional error correcting decoder, as explained below.

In one embodiment of the invention, the low speed clock was at 1.584 MHz. The generator 204 generates a clock of slightly higher rate (for example, a 2.112 MHz.) to account for the use of forward acting error correcting coding and decoding, if employed.

The de-stuff pulse generator 203 is also clocked by the transmit clock or a sub-multiple thereof, and synchronized with the frame synchronization generator. The de-stuff pulse generator 203 generates a series of de-stuff signals which are complementary to the stuffing signals generated by the stuffing generator 102. More particularly, in eah TDMA frame, nine de-stuffing frames are produced, each de-stuffing frame including three fixed de-stuff pulses and a single variable de-stuff pulse, i.e., see FIG. 1E. While the specific location of the fixed and variable de-stuff pulses in the frame is not critical to the invention, the location of the de-stuff pulses should, of course, match the location of the stuffing pulses generated at the transmit side, and as illustrated in FIGS. 1E and 1F, the time spacing between adjacent fixed de-stuff pulses and between the last fixed de-stuff pulse and the variable de-stuff pulse is equal.

The preset generator 201, clocked by the transmit clock, or a sub-multiple thereof, and synchronized to the received frame synchronization signal, is generated once per TDMA frame, i.e., see FIG. 2B, and is employed at the ports to reset the memory address counters.

The clock gate 216 is clocked by the receive clock, that is a clocking signal generated by a clock recovery circuit, and provides the high speed clock to the various ports. The high speed clock thus provided is nominally at a 31 MHz., which is a TDMA symbol rate, in an embodiment of the invention which has been constructed.

As mentioned in connection with FIG. 4, in the absence of forward acting error encoding, it is worthwhile to stretch the first and third of the stuffing code pulses for error protection purposes. To this end, a stretch pulse is produced at the time of the first and third fixed de-stuff pulses by the event decoder 211. This stretch pulse is coupled to the stuff de-stretcher 219 which is also clocked by the receive clock. The stuff de-stretcher 219 is arranged to eliminate two clock pulses per occurrence by inhibiting the clock gate at the time of those clock pulses. Accordingly, the high speed clocks, while nominally at 31 MHz., are modified as stated above, and provided to the ports as the high speed clock.

From the foregoing description, the operation of the inventive apparatus should be apparent. More particularly, a plurality of ports, in an embodiment of the invention which has been constructed, 28 are each capable of accepting asynchronous data, for example, in a T1 format, i.e., nominally 1.544 MHz. This data is buffered at the elastic buffer 23 and by use of stuffing techniques the data rate is increased to a synchronous rate which is common to all of the ports, transmit side. In an embodiment of the invention which has been constructed, this is 1.584 MHz. Stuffing occurs synchronously in all the ports, transmit side, and thus, a common stuffing generator is employed, common to all the ports. Based upon the condition of each elastic buffer, a pulse may be stuffed, if necessary, to maintain the desired synchronous rate at the output of the elastic buffer. On the other hand, if sufficient data is present, the stuffing will be suppressed, and instead of a stuffed pulse, a data pulse will be included in the data stream at the synchronous rate.

The now synchronous stream is coupled into the compression portion of the typical port, transmit side, at the low speed clock rate synchronized with the preset signal and enabled at the various ports in response to their associated data gate. The compression memories 29, 30 are alternately read out at the high speed clock rate and the data so read out is placed on the transmit bus 17.

The data gates which enable various ones of the ports, at the proper time in the frame, are generated in the transmit steering and control in response to the network plan memory 107. As disclosed, this network plan memory can be semi-permanent, in the form of a read only memory, or can be under software control. The transmit steering and control, partially in response to the network plan memory, and clocked at the TDMA transmit rate, generates the various high speed and low speed clocks as well as the various control commands necessary for operation of the transmit side of the port.

The operation of the receive side of a typical port is entirely complementary, and a further discussion thereof is not believed necessary.

The extreme simplicity of the disclosed arrangement enhances its flexibility by allowing a number of optional features. For example, as will be disclosed below, the typical port, both transmit and receive side, can include apparatus for forward acting error correcting coding and decoding, with some very simple modifications. In addition, although the ports have been disclosed as capable of handling data in a T1 format, the port can be reconfigured in a simple fashion, either manually, or under software control, to accept data at sub-multiples of the T1 data rate.

FIGS. 6 and 7 illustrate the typical port transmit and receive side, respectively, incorporating, respectively, forward acting error correcting encoding and decoding. More particularly, as shown in FIG. 6, a forward acting error correcting encoder 50 is inserted in the path between the multiplexer 25 and the input buffer 27. To operate, this encoder is also subjected to a low speed clock and an intermediate speed clock, the latter being derived from the transmit steering and control clock generator 104. At the same time, FIG. 6 differs from FIG. 2A in that the clock selector 32 does not receive the transmit low speed clock, but rather, receives the transmit intermediate clock.

As is well known to those skilled in the art, forward acting error correcting encoding increases the nominal bit rate by the amount of error correcting encoding. For example, a ⅔th rate encoder increases the bit rate by a factor of 4/3. Accordingly, for the embodiment in which the low speed clock is set 1.584 MHz., the intermediate speed clock for a rate ¾ths encoder is at 2.112 MHz.

Since the bit rate of the forward acting error correcting encoder 50 has been increased, the writing clock to the clock selector 32 must match this information rate, and accordingly, the transmit intermediate speed clock is provided to the clock selector 32 as the memory write clock.

Inasmuch as forward acting error correcting encoders are known to those skilled in the art, it is not believed necessary to disclose a particular example of such encoder. It should be noted that the pulse stuffing operations in the typical port are unaffected by whether or not a forward acting error correcting encoder is employed. More particularly, the same fixed and variable stuff pulses can be employed.

FIG. 7 illustrates similar changes to typical port at the receive side for forward acting error correcting decoding. More particularly, clock selector 32 receives, as the memory write clock, the intermediate speed clock rather than the low speed clock as shown in FIG. 3A. In addition, the forward acting error correcting decoder 51 is coupled serially between the output selector and buffer 38 and the elastic buffer 43. To operate properly, this decoder is subjected to the intermediate speed clock as well as the low speed clock. Much as in the transmit side of the port, in the receive side de-stuffing occurs at the same rate as in ports which do not use forward acting error correcting, and therefore, the same fixed and variable stuff pulses can be employed.

Accordingly, it should be evident how simple it is for a port to be changed from an error correcting encoding or decoding port to a port not employing this technique. Since the cost of the components of the forward acting error correcting encoding technique are so low, it is preferable not to provide ports without this capability. Instead, when a port is not to employ the capability, a shunt path is provided around the encoder or decoder, as desired, along with a switching arrangement to select the appropriate writing clock for the selectors 35 and 32.

A multiplexer-demultiplexer in accordance with the invention can operate with ports of all equal nominal data rates, i.e., T1 ports, or can have ports whose data rates are sub-multiples of this nominal rate. For example, for a ½ T1 or ¼ T1 port, it is only necessary to divide down the low speed clock by the appropriate rate, preferably at the port, using a simple ÷2 or ÷4 circuit. If the port has FEC capability, then the intermediate clock is similarly divided. This insures that the low and intermediate clocks are in the proper ratio.

A similar adjustment is also necessary for the fixed and variable stuff and de-stuff pulses. Namely, both the fixed and variable pulse trains are divided by the appropriate factor. To insure that a minimum number of stuff opportunities are available the first pulse of each pair in each train are used (for ½ T1 for example) insuring that more than ½ are used for pulses of odd number per frame. Similarly, for ¼ rate, the first of each four pulses are used and the next three deleted. The pulse dividing is, of course, accomplished separately for both fixed and variable stuff pulses.

From the preceding it is apparent that the elastic buffers in the ports, transmit side, are read substantially synchronously, i.e., the reading is synchronous since the read clock is the same at each port, except for the stuffing action which to a slight extent say ±130 pulses per $10^6$ adjusts the reading rate.

It should be apparent that while a station may transmit a single burst per frame, it may also transmit multiple bursts per frame with only two restrictions. Only one sub-burst per port per frame is allowed and each burst must be preceded by the preamble. Both restrictions are handled by the network plan memory which stores the events which control burst position and duration as well as the composition of each burst.

On the receive side, the station will receive the multiple bursts which make up the TDMA frame. Suitable data gates are generated by the network plan memory to allow selected ports to decode suitable bursts or portions thereof.

What is claimed is:

1. An asynchronous TDMA multiplexer with plural input ports for receiving plural asynchronous bit streams and for, on command, producing a continuous high rate bit stream consisting of sequential continuous high rate bit stream portions from a plurality of said ports, in which each of said plural input ports includes:
    elastic buffer means for writing therein in response to data received at said port, at a rate equal to the rate of receipt of said data,
    means for reading data from said elastic buffer means substantially synchronously and simultaneously, and at a first rate at all said ports,
    a compression buffer means for writing therein data read from said elastic buffer means and means for reading data from said compression buffer means at said high rate,
and in which said multiplexer further includes a common control means including:
    clock means for generating a clocking signal at said first rate and for generating a clocking signal at said high rate and coupling means for coupling said clocking signals to all said ports, said coupling means coupling said high rate clocking signal for readout from said compression buffer means and coupling said first rate clocking signal for readout from said elastic buffer means, and
    gating means coupled to all said ports for producing said command for selectively gating reading of said compression buffer means at selected ones of said ports at selected times.

2. The apparatus of claim 1 in which each of said ports includes:
    pulse stuffing means responsive to said elastic buffer means for at times inserting a dummy pulse into said data read from said elastic buffer means,
    said common control means including
    first means for periodically generating a stuff command and means for coupling commands from first means to pulse stuffing means in each of said ports,
    said pulse stuffing means producing and inserting said dummy pulse but only at the time of said stuff command and then only responsive to the condition of said elastic buffer means.

3. The apparatus of claim 2 wherein said first means generates at least three stuff sample commands for each said stuff command and in which
    said pulse stuffing means, at each of said ports, produces and simultaneously inserts an identical stuff command pulse on reception of each said pulse stuff sample command, said stuff command pulse having one of two states depending on the need for a dummy pulse.

4. The apparatus of claim 1 in which at least some of said input ports include a forward acting error correcting encoder said clock means generating an intermediate clocking signal at a rate between said first rate and said high rate, said forward acting error correcting encoder coupled between said elastic buffer and said compression buffer means responsive to both said first rate and intermediate rate clocking signals, said forward acting error correcting encoder writing data in said compression buffer means in response to said intermediate clocking signal.

5. The apparatus of claim 4 in which said clock means is clocked at said high rate and responds to and is synchronized by a TDMA frame synchronization pulse.

6. An asynchronous TDMA demultiplexer receiving a high rate bit stream and for producing therefrom plural continuous bit streams at a lower rate, asynchronous to each other, comprising:

a plurality of receive ports each including, expansion buffer means for writing therein in response to said high rate bit stream, portions of said high rate bit stream selected by gating commands, means for reading data from said expansion buffer means in response to a read clock, an elastic buffer means and means for writing into said elastic buffer means data read from said expansion buffer means, means for reading from said elastic buffer means at a rate determined by the average writing rate, and common control means for generating and coupling signals to all said ports including, common clock means for generating a clocking signal at said high rate, and at said read clock rate, and coupling means for coupling all said clocking signals to all said ports, said coupling means coupling said high rate clock signal for writing into said expansion buffer means and coupling said read clock clocking signal for reading from said expansion buffer means, and gating generator means coupled to all said ports for selectively gating writing into expansion buffer means of selected ports with selected portions of high rate bit stream.

7. The apparatus of claim 6 in which said TDMA demultiplexer is included in a TMDA station also including a transmit clock generator, said common clock means including generator means clocked by said transmit clock generator for generating said read clock.

8. The apparatus of claim 7 further including:

pulse de-stuffing means including stuff code detecting means responsive to data read from said expansion buffer means, said stuff code detecting means responsive to plural de-stuff sample commands for sampling said data read from said expansion buffer means and for producing a de-stuff command if said sampled output indicates the presence of a dummy pulse in said data stream, said pulse de-stuffing means further including gating means responsive to a clocking signal and to said de-stuff command and to a de-stuff control signal for coupling said clocking signal to a writing input of said elastic buffer means and for omitting a pulse from said clocking signal subsequent to receipt of said de-stuff command at the time of said de-stuff control signal.

9. The apparatus of claim 8 in which said common clock means periodically generates said plural de-stuff sample commands and said de-stuff control signal, plural de-stuff sample commands generated for each said de-stuff control signal.

10. The apparatus of claim 9 in which said clocking signal applied to said gating means of said pulse de-stuffing means comprises said read clock clocking signal.

11. The apparatus of claim 7 in which at least some of said ports further include:

a forwarding acting error correcting decoder coupled between said expansion buffer means and said elastic buffer means, said clock means generating a second clocking signal at a second rate lower than said read clock, said forward acting error correcting decoder responding to said read clock and said second clocking signals and data read from said expansion buffer means to produce a data stream synchronous with said second clocking signal for writing into said elastic buffer means.

12. The apparatus of claim 11 in which each of said ports includes:

a phase locked loop means producing a nominal clocking signal equal to said average writing rate, control means responsive to said elastic buffer means for controlling said phase locked loop means to produce a clocking signal tracking variations in said writing rate.

* * * * *